UNITED STATES PATENT OFFICE.

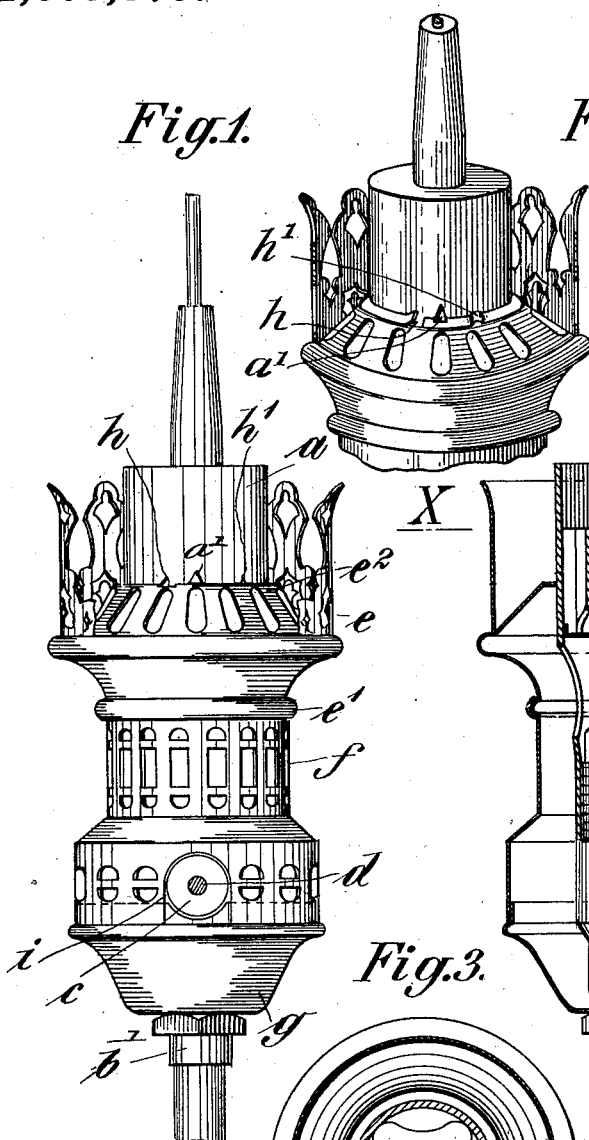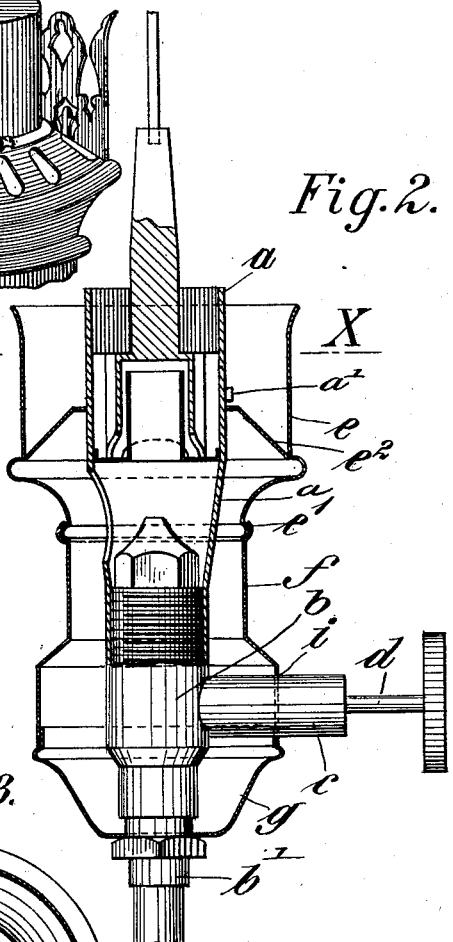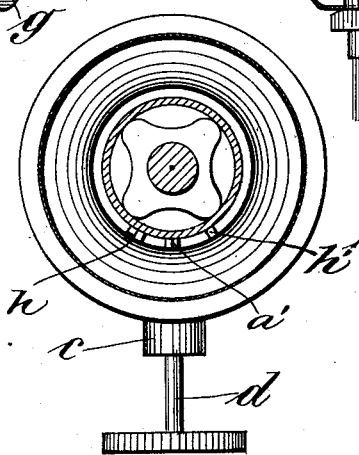

CARL PAUL BOTT, OF LEIPZIG-SELLERHAUSEN, GERMANY.

GAS-BURNER.

1,009,379.  Specification of Letters Patent.  Patented Nov. 21, 1911.

Application filed September 21, 1910. Serial No. 583,095.

*To all whom it may concern:*

Be it known that I, CARL PAUL BOTT, a subject of the King of Wurttemberg, residing at 15 Bautzmannstrasse, Leipzig-Sellerhausen, Germany, have invented certain new and useful Improvements in Gas-Burners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject matter of my invention is an improved incandescent gas burner, particularly for burning compressed gas carbureted with benzol.

My invention substantially consists in connecting the gallery of the burner with the basket of the burner non-detachably but in such a manner that the gallery can be rotated in the basket. Owing to this arrangement it is possible to remove both parts simultaneously from and attach them simultaneously to the remaining parts of the burner. This is possible because the rotatable gallery has within it a collar provided with a recess enabling it to be pushed over a projection on the burner tube. By rotating the gallery up to a stop provided on the collar the former is attached to the burner tube simultaneously with the attachment of the basket to the tube. Besides being made more cheaply, such a burner has the advantage of great simplicity and the parts of the burner are securely attached together. The arrangement is particularly adapted for burners in which there is arranged at the bottom portion of the burner tube, close above the heating dish, a lateral socket through which the regulating screw passes. This lateral socket and the projection form two fixed stops on the burner tube, the relative position of which is not always the same because that part of the burner tube which has the projection is screwed onto the bottom part of the burner tube which has the socket. Therefore, the basket is provided with a recess so that it can pass over the socket or bottom lateral stop, and if the basket and gallery are to be attached on the burner tube by means of one single manipulation, an arrangement must be made which adapts itself to the varying position of the two fixed stops. To this end I arrange the gallery rotatably in the basket.

One illustrative embodiment of my invention is represented by way of example in the accompanying drawing, wherein:

Figure 1 is an elevation of an incandescent gas burner for burning compressed air carbureted with benzol, a part of the gallery of the burner being shown broken away. Fig. 2 is an elevation, partly in section, showing the burner rotated 90°, and Fig. 3 is a horizontal section on the line X—X in Fig. 2, Fig. 4 is a perspective view of the upper part of the burner.

The burner tube consists of two parts $a$ and $b$ which are screwed together as shown in Fig. 2. The lower part $b$ is adapted to be screwed onto a gas supply pipe $b'$ in the usual manner and is provided with a horizontal socket $c$ containing a regulating screw $d$.

A gallery as $e$ is connected to a basket $f$ by means of beads $e'$, formed on the adjacent ends of the gallery and basket, said beads being interlocked and forming a connection which permits of a relative rotation of the parts around the burner tube.

A heating cup $g$ surrounds the lower parts $b$ of the burner tube below the socket $c$ and is connected to the basket by means of its top rim being pushed into the bottom rim of the basket. The latter has a recess $i$ formed in its lower edge for the passage of the socket $c$ which forms a stop for the basket and serves to lock the latter to the burner-tube.

The gallery $e$ has an internal collar $e^2$ which surrounds the upper part $a$ of the burner tube and said collar has an incision $h$ to receive a projection $a'$ formed on the part $a$ of the burner tube.

The projection $a'$ is passed through the incision $h$ and then by rotating the gallery, until a stop $h'$, formed on the upper edge of the collar, abuts against the projection $a'$, the gallery and tube are locked together. As the gallery $e$ is rotatably connected with the basket $f$ the recess $i$ in the latter can be pushed down over the socket $c$ simultaneously with the movement of the collar below the projection $a'$ on the burner tube.

I claim:

1. An incandescent gas burner comprising a burner tube formed in two parts, a gallery adapted to be engaged by a projection on one part of the tube, and a basket rotatably connected with the gallery adapted to engage a stop on the other part of said tube simultaneously with the engagement of the gallery by the projection.

2. An incandescent gas burner comprising a burner tube formed of two parts detachably connected together, a gallery adapted to be engaged by a projection on the upper part of the tube, a socket on the lower part of the tube, and a basket connected with and rotatable on the gallery, said basket having a notch adapted to engage the socket simultaneously with the engagement of the gallery by the projection.

In testimony that I claim the foregoing as my invention, I have signed my name in presence of two subscribing witnesses.

CARL PAUL BOTT.

Witnesses:
EMIL BREMNECKE,
JOSEF HUBNEY.

Copies of this patent may be obtained for five cents each, by addressing the "Commissioner of Patents, Washington, D. C."